US012646301B2

(12) United States Patent
Kaneko et al.

(10) Patent No.: US 12,646,301 B2
(45) Date of Patent: Jun. 2, 2026

(54) LEARNING DEVICE, PARAMETER ADJUSTMENT METHOD AND RECORDING MEDIUM

(71) Applicant: NEC Corporation, Tokyo (JP)

(72) Inventors: Tomokazu Kaneko, Tokyo (JP); Soma Shiraishi, Tokyo (JP); Ryosuke Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 18/387,515

(22) Filed: Nov. 7, 2023

(65) Prior Publication Data

US 2024/0153255 A1 May 9, 2024

(30) Foreign Application Priority Data

Nov. 9, 2022 (JP) ................................. 2022-179283

(51) Int. Cl.
*G06V 10/776* (2022.01)
*G06V 10/764* (2022.01)
*G06V 10/77* (2022.01)
*G06V 20/40* (2022.01)

(52) U.S. Cl.
CPC .......... *G06V 10/776* (2022.01); *G06V 10/764* (2022.01); *G06V 10/7715* (2022.01); *G06V 20/46* (2022.01)

(58) Field of Classification Search
CPC .. G06V 10/776; G06V 10/7715; G06V 20/46; G06V 10/764; G06V 10/70
See application file for complete search history.

(56) References Cited

U.S. PATENT DOCUMENTS

| | | | | |
|---|---|---|---|---|
| 2020/0250436 A1* | 8/2020 | Lee | ......................... | G06V 10/82 |
| 2021/0042963 A1* | 2/2021 | Takagi | ................... | G06V 10/44 |
| 2022/0198783 A1* | 6/2022 | Yoshida | .............. | G06V 10/454 |
| 2023/0191605 A1* | 6/2023 | Handa | ................... | B25J 9/1689 |
| | | | | 700/257 |
| 2024/0127440 A1* | 4/2024 | Hatsutani | ............. | G06V 10/273 |

FOREIGN PATENT DOCUMENTS

WO      WO-2020240727 A1 * 12/2020   ............. G06V 40/20

OTHER PUBLICATIONS

Francesco Locatello,et.al, "Object-Centric Learning with Slot Attention", [online], Oct. 14, 2020, arXiv, [Search on Oct. 28, 2022], Internet<URL:https://arxiv.org/pdf/2006.15055.pdf>.

* cited by examiner

*Primary Examiner* — Syed Haider

(57) ABSTRACT

A learning device includes a learning model for a still image. The learning model includes a mask generation means configured to generate a first object mask identifying an area in which an object exists in a still image, for each individual object. A first parameter including at least one parameter used for processing of generating the first object mask is adjusted based on a first loss. The first loss indicates a difference of the first object mask with respect to a second object mask identifying an area in which an object exists in a moving image including the still image, for each individual object.

9 Claims, 8 Drawing Sheets

FIG. 2

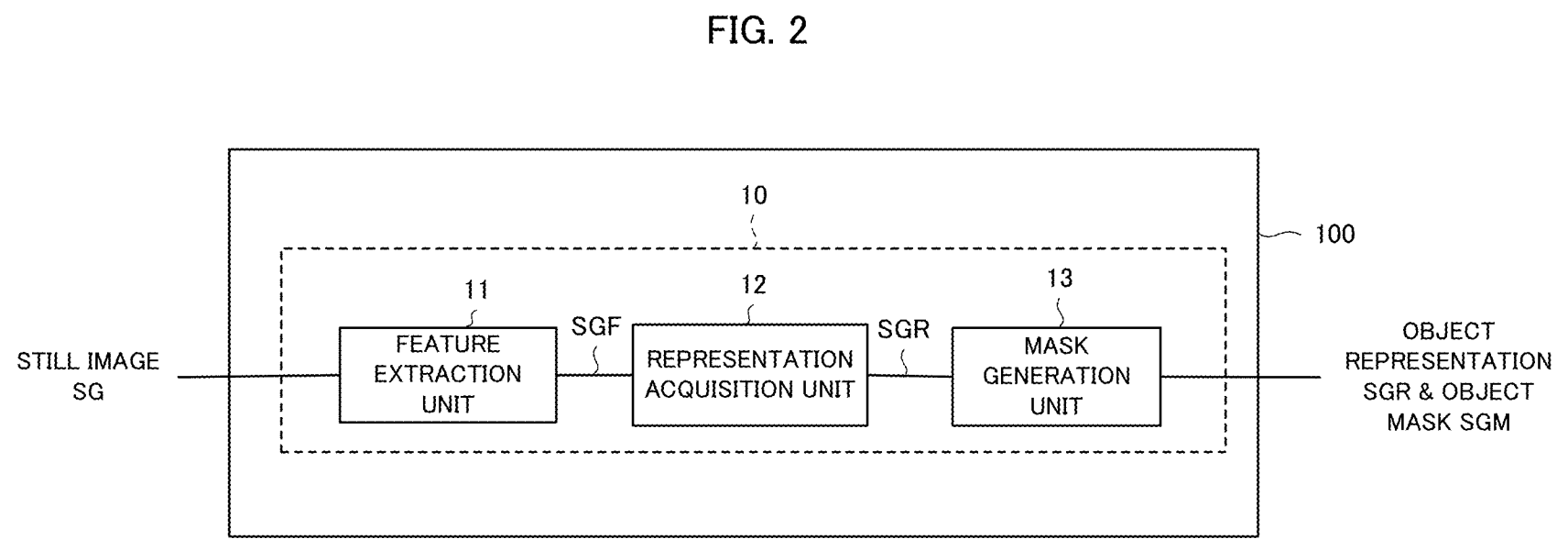

STILL IMAGE SG

100

10

11 FEATURE EXTRACTION UNIT

SGF

12 REPRESENTATION ACQUISITION UNIT

SGR

13 MASK GENERATION UNIT

OBJECT REPRESENTATION SGR & OBJECT MASK SGM

START

SET PARAMETERS FOR PROCESSING
IN INDIVIDUAL PARTS OF LEARNING MODEL     S11

EXTRACT FEATURE QUANTITY REPRESENTING
ENTIRE FEATURE OF STILL IMAGE     S12

ACQUIRE OBJECT REPRESENTATION
FOR INDIVIDUAL OBJECTS IN STILL IMAGE     S13

GENERATE OBJECT MASK
IDENTIFYING INDIVIDUAL OBJECT AREAS     S14

OUTPUT OBJECT REPRESENTATION
AND OBJECT MASK     S15

END

LEARNING DEVICE

LEARNING MODEL ～ 510

MASK
GENERATION
MEANS ～ 520

STILL
IMAGE

OBJECT
MASK

FIRST LOSS

LEARNING DEVICE, PARAMETER ADJUSTMENT METHOD AND RECORDING MEDIUM

TECHNICAL FIELD

The present disclosure relates to machine learning techniques.

BACKGROUND ART

In the field of machine learning, there have been proposed machine learning models, which are trained to acquire object representations for each individual object included in an unsupervised image in recent years.

Specifically, for example, Non-Patent Document 1 proposes a machine learning model that is trained to acquire an object representation for each individual object included in a still image.

Further, the object representation obtained by the machine learning model trained as described above can be utilized, for example, in the processing related to object recognition.

RELATED ART

Non-Patent Document

Non-Patent Document 1: Francesco Locatello, et. al, "Object-Centric Learning with Slot Attention", [online], Oct. 14, 2020, arXiv, [Search on Oct. 28, 2022], Internet<URL:https://arxiv.org/pdf/2006.15055.pdf>

SUMMARY

Problem to be Solved

However, according to the technique disclosed in Non-Patent Document 1, for example, in the case where an object having a complicated texture is included in the still image, due to fact that the recognition of the boundary of the object is difficult, the acquisition accuracy of the object representation is lowered.

In other words, according to the technique disclosed in Non-Patent Document 1, there is such a problem corresponding to the aforementioned problem that the recognition accuracy in the object recognition is lowered.

An object of the present disclosure is to provide a learning device capable of preventing deterioration of recognition accuracy in object recognition.

Means for Solving the Problem

According to an example aspect of the present invention, there is provided a learning device comprising a learning model for a still image,
wherein the learning model includes a mask generation means configured to generate a first object mask identifying an area in which an object exists in a still image, for each individual object, and
wherein a first parameter including at least one parameter used for processing of generating the first object mask is adjusted based on a first loss, the first loss indicating a difference of the first object mask with respect to a second object mask identifying an area in which an object exists in a moving image including the still image, for each individual object.

According to another example aspect of the present invention, there is provided a parameter adjustment method applied to a learning model for a still image that generates a first object mask identifying an area where an object exists in a still image for each individual object, the method comprising:
adjusting a first parameter including at least one parameter used for processing of generating the first object mask based on a first loss, the first loss indicating a difference of the first object mask with respect to a second object mask identifying an area where an object exists in a moving image including the still image, for each individual object.

According to still another example aspect of the present invention, there is provided a recording medium storing a program, the program causing a computer to execute processing for a learning model for a still image that generates a first object mask identifying an area where an object exists in a still image for each individual object, the processing comprising:
adjusting a first parameter including at least one parameter used for processing of generating the first object mask based on a first loss, the first loss indicating a difference of the first object mask with respect to a second object mask identifying an area where an object exists in a moving image including the still image, for each individual object.

Effect

According to the present disclosure, it is possible to prevent deterioration of recognition accuracy in object recognition.

BRIEF DESCRIPTION OF THE DRAWINGS

FIG. 2 is a block diagram illustrating a functional configuration of a learning device according to a first example embodiment;

FIG. 8 is a block diagram illustrating a functional configuration of a learning device according to a second example embodiment.

EXAMPLE EMBODIMENTS

Preferred example embodiments of the present disclosure will be described with reference to the accompanying drawings.

[Hardware Configuration]

Figure 1:
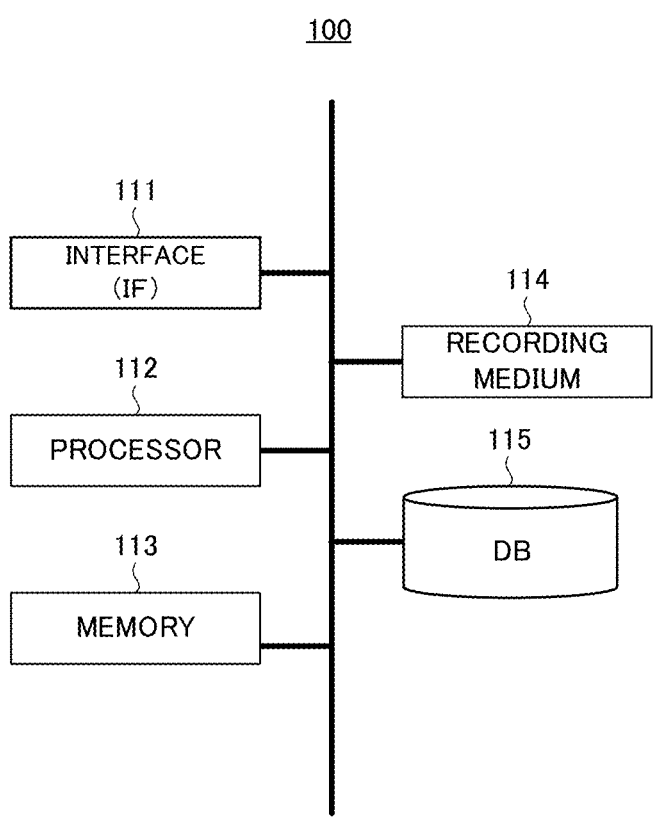
FIG. 1 is a block diagram illustrating a hardware configuration of a learning device according to a first example embodiment.

FIG. 1 is a block diagram illustrating a hardware configuration of a learning device according to a first example embodiment. As illustrated in FIG. 1, the learning device 100 includes an interface (IF) 111, a processor 112, a memory 113, a recording medium 114, and a DB 115.

The IF 111 inputs and outputs data to and from external devices. For example, a still image including objects captured by a camera or the like is inputted through the IF 111 to the learning device 100.

The processor 112 is a computer such as a CPU (Central Processing Unit) and controls the entire learning device 100 by executing a program prepared in advance. Specifically, the processor 112 performs processing for acquiring an object representation for each individual object included in the still image, for example.

The memory 113 may include a ROM (Read Only Memory), a RAM (Random Access Memory), and the like. The memory 113 is also used as a working memory during various processing operations by the processor 112.

The recording medium 114 is a non-volatile and non-transitory recording medium such as a disk-like recording medium, a semiconductor memory, or the like, and is configured to be detachable from the learning device 100. The recording medium 114 records various programs executed by the processor 112. When the learning device 100 executes various kinds of processing, the program recorded in the recording medium 114 is loaded into the memory 113 and executed by the processor 112.

The DB 115 stores information inputted through the IF 111 and the processing results obtained by the processing of the processor 112, for example.

[Functional Configuration]

FIG. 2 is a block diagram illustrating a functional configuration of the learning device according to the first example embodiment. As shown in FIG. 2, the learning device 100 includes a learning model 10.

The learning model 10 is configured as a machine learning model for a still image, that is trained to be able to acquire an object representation for each individual object included in an unsupervised still image. Also, the learning model 10 has a configuration that corresponds to a world model for still images, such as the model disclosed in Francesco Locatello, et. al, "Object-Centric Learning with Slot Attention, for example. As shown in FIG. 2, the learning model 10 includes a feature extraction unit 11, a representation acquisition unit 12, and a mask generation unit 13.

The feature extraction unit 11 has a function as a feature extraction means. The feature extraction unit 11 extracts the feature quantity SGF representing the feature of the entire still image SG inputted from the outside of the learning device 100 and outputs the extracted feature quantity SGF to the representation acquisition unit 12.

The representation acquisition unit 12 has a function as a representation acquisition means. The representation acquisition unit 12 calculates the representation vectors SGV corresponding to the individual objects included in the still image SG based on the feature quantity SGF extracted by the feature extraction unit 11. The representation vectors SGV include the same number of vectors as the number of objects in the still picture SG. The representation acquisition unit 12 acquires the calculation result of the representation vectors SGV as the object representation SGR for the individual objects in the still image SG and outputs the acquired object representation SGR to the mask generation unit 13.

The mask generation unit 13 has a function as a mask generation means. The mask generation unit 13 estimates the object areas SGA that are the areas where the objects exist in the still image SG on the basis of the object representation SGR obtained by the representation acquisition unit 12.

Figure 3:
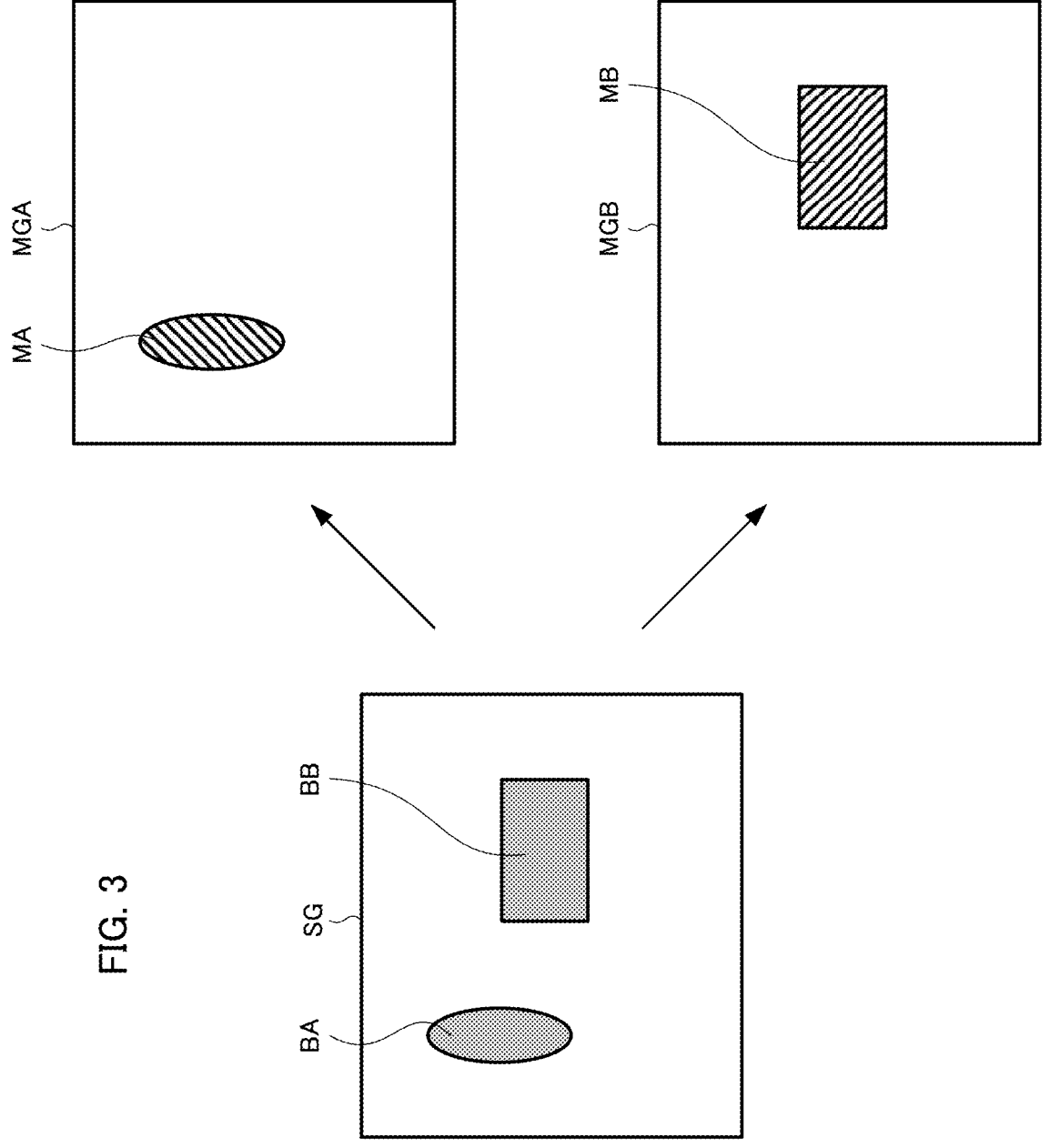
FIG. 3 is a diagram showing an outline of processing related to generation of the mask image.

Also, the mask generation unit 13 generates an object mask SGM capable of identifying the individual object areas SGA obtained by the above-described estimation. The object mask SGM is generated, for example, as a mask image in which the individual object areas SGA are filled with different colors. Also, the object mask SGM includes the same number of mask images as the number of objects in the still image SG. Specifically, the mask generation unit 13 generates the mask images MGA and MGB as shown in FIG. 3 as the mask images corresponding to the still image SG, for example. FIG. 3 is a diagram showing an outline of the processing for the generation of the mask images. The mask image MGA includes a mask MA which indicates the object area corresponding to the object BA in the still image SG. The mask image MGB includes a mask MB which indicates the object area corresponding to the object BB in the still image SG. In FIG. 3, for convenience of illustration, the masks MA and MB are shown as the areas differently hatched from each other, rather than areas filled with different colors. That is, the mask generation unit 13 generates the object mask SGM capable of identifying the object areas SGA, in which the objects exist in still picture SG, for each individual object based on the object representation SGR obtained by the representation acquisition unit 12. The mask generation unit 13 outputs the object mask SGM and the object representation SGR to the outside of the learning device 100.

[Knowledge Distillation]

Figure 4:
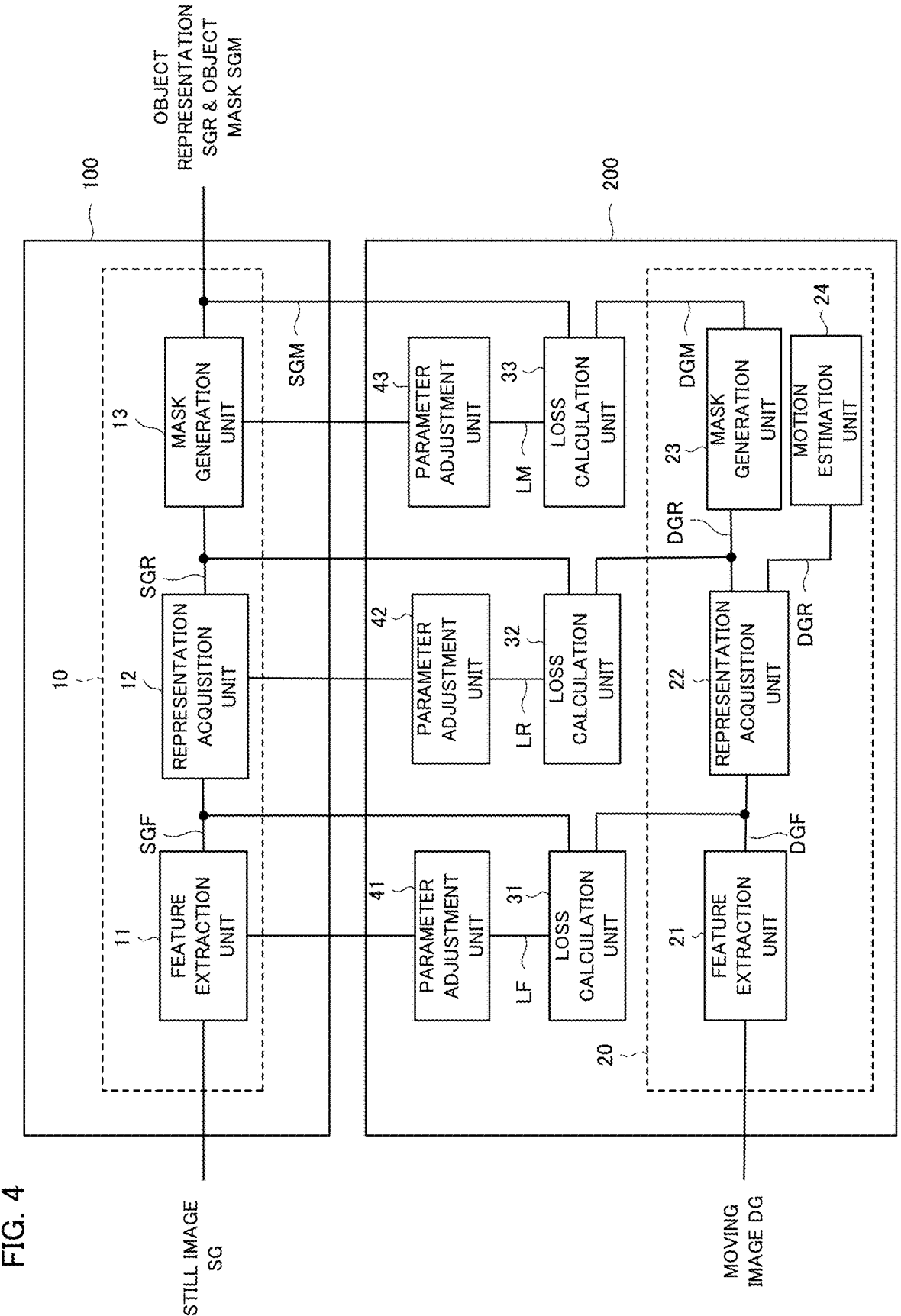
FIG. 4 is a block diagram for explaining a configuration of an information processing device used to distill knowledge inherited in the learning device according to the first example embodiment.

In this example embodiment, for example, the knowledge distilled by the information processing device 200 as shown in FIG. 4 is inherited by the learning model 10. A specific configuration of the information processing device 200 for enabling such knowledge distillation will be described below. FIG. 4 is a block diagram for describing the configuration of the information processing device used to distill the knowledge to be inherited by the learning device according to the first example embodiment.

The information processing device 200 has a hardware configuration similar to the learning device 100. The information processing device 200 is configured to be attachable to and detachable from the learning device 100. The information processing device 200 includes a learning model 20, a loss calculation units 31, 32, and 33, and parameter adjustment units 41, 42, and 43, as shown in FIG. 4.

The learning model 20 is configured as a machine learning model for a moving image, that is trained to acquire an object representation for each individual object included in the unsupervised moving image. Also, the learning model 20 has a configuration that corresponds to a world model for moving images, such as the model disclosed in Thomas Kipf, et. al, "Conditional Object-Centric Learning from Video. As shown in FIG. 4, the learning model 20 includes a feature extraction unit 21, a representation acquisition unit 22, a mask generation unit 23, and a motion estimation unit 24.

The feature extraction unit 21 extracts the feature quantity DGF representing the feature of the entire moving image DG inputted from the outside of the information processing device 200 and outputs the extracted feature quantity DGF to the representation acquisition unit 22.

The representation acquisition unit 22 calculates the representation vectors DGV corresponding to the individual objects existing in the moving image DG on the basis of the feature quantity DGF extracted by the feature extraction unit 21. The representation vectors DGV include the same number of vectors as the number of objects in the moving image DG. The representation acquisition unit 22 acquires the calculation result of the representation vectors DGV as the object representation DGR for the individual objects in the moving image DG, and outputs the acquired object representation DGR to the mask generation unit 23 and the motion estimation unit 24.

Based on the object representation DGR obtained by the representation acquisition unit 22, the mask generation unit 23 estimates the object area DGA that is the area where the object exists in the moving image DG. Also, the mask generation unit 23 generates an object mask DGM capable of identifying individual object areas DGA obtained by the above-described estimation. The object mask DGM is generated, for example, as the mask image in which the individual object areas DGA are filled with different colors. Also, the object mask DGM includes the same number of mask images as the number of objects in the moving image DG. Specifically, the mask generation unit 23 generates the mask image similar to that exemplified in FIG. 3 for each of the plurality of time-series images included in the moving image DG, by performing the same processing as the mask generation unit 13. That is, the mask generation unit 23 generates the object mask DGM identifying the object area DGA in which an object exists in the moving image DG for the individual objects based on the object representation DGR obtained by the representation acquisition unit 22.

The motion estimation unit 24 estimates the motion of the individual objects included in the moving image DG by computing the optical flow based on the object representation DGR obtained by the representation acquisition unit 22. Also, the motion estimation unit 24 acquires the estimation result obtained by the above-described estimation as the motion data DGU.

The feature quantity SGF extracted by the feature extraction unit 11 and the feature quantity DGF extracted by the feature extraction unit 21 are inputted to the loss calculation unit 31. The loss calculation unit 31 calculates a loss LF indicating the difference of the feature quantity SGF with respect to the feature quantity DGF, and outputs the calculated loss LF to the parameter adjustment unit 41. The above-described difference may be read as an error or a deviation amount.

The object representation SGR extracted by the representation acquisition unit 12 and the object representation DGR obtained by the representation acquisition unit 22 are inputted to the loss calculation unit 32. The loss calculation unit 32 calculates a loss LR indicating the difference of the object representation SGR with respect to the object representation DGR, and outputs the calculated loss LR to the parameter adjustment unit 42. Specifically, the loss calculation unit 32 acquires a set of n vectors in which similar vectors are associated with each other between n vectors included in the representation vectors DGV of the object representation DGR and n vectors included in the representation vectors SGV of the object representation SGR, by performing processing using the Hungarian algorithm and the cosine similarity, for example. Then, the loss calculation unit 32 calculates the differences in each of the n sets of vectors acquired as described above as the loss LR. The above-described difference may be read as an error or a deviation amount.

The object mask SGM generated by the mask generation unit 13 and the object mask DGM generated by the mask generation unit 23 are inputted to the loss calculation unit 33. The loss calculation unit 33 calculates a loss LM indicating the difference of the object mask SGM with respect to the object mask DGM, and outputs the calculated loss LM to the parameter adjustment unit 43. Specifically, the loss calculation unit 33 acquires n sets of mask images in which similar mask images are associated with each other between p mask images included in the object mask DGM and p mask images included in the object mask SGM, by performing processing using the Hungarian algorithm and the cosine similarity, for example. Then, the loss calculation unit 33 calculates the difference in each of the n sets of the acquired masked images obtained as described above as the loss LM. The above-described difference may be read as an error or a deviation amount.

The parameter adjustment unit 41 adjusts at least one parameter used in the processing of extracting the feature quantity SGF by the feature extraction unit 11 based on the loss LF calculated by the loss calculation unit 31.

The parameter adjustment unit 42 adjusts at least one parameter used in the processing of acquiring the object representation SGR by the representation acquisition unit 12 based on the loss LR calculated by the loss calculation unit 32.

The parameter adjustment unit 43 adjusts at least one parameter used in the processing of generating the object mask SGM by the mask generation unit 13 based on the loss LM calculated by the loss calculation unit 33.

According to the information processing device 200 having the above-described configuration, since the processing of knowledge distillation is performed in the loss calculation units 31, 32, and 33 and the parameter adjustment units 41, 42, and 43, the characteristics (merits) of the learning model 20 can be inherited by the learning model 10. In other words, the learning device 100 can set parameters for the processing in the individual parts (the feature extraction unit 11, the representation acquisition unit 12, and the mask generation unit 13) of the learning model 10 so that the characteristics (merits) of the learning model 20 corresponding to the knowledge distilled by the information processing device 200 are inherited.

When the knowledge distillation is performed using the information processing device 200 having the above-described configuration, for example, the moving image DG may be inputted to the learning model 20, and the still images SG obtained by dividing the moving image DG for each frame may be sequentially inputted to the learning model 10.

Further, when the knowledge distillation is performed using the information processing device 200 having the configuration as described above, it is desirable that the parameter adjustment by the parameter adjustment units 41, 42, and 43 is repeated until all of the loss LF, the loss LR, and the loss LM become 0. In other words, it is desirable that at least one parameter used in the processing for extracting the feature quantity SGF, at least one parameter used in the processing for acquiring the object representation SGR, and at least one parameter used in the processing for generating the object masking SGM are adjusted such that the loss LF, the loss LR, and the loss LM are all 0. According to the parameter adjustment described above, the robustness against texture, which is the characteristic (merit) of the learning model 20, can be inherited by the learning model 10. Further, according to the above-described parameter adjustment, for example, even when an object having a complicated texture is included in the still image, the learning model 10 can appropriately recognize the boundary of the object. Therefore, the acquisition accuracy of the object representation by the learning model 10 can be improved.

[Processing Flow]

Figure 5:
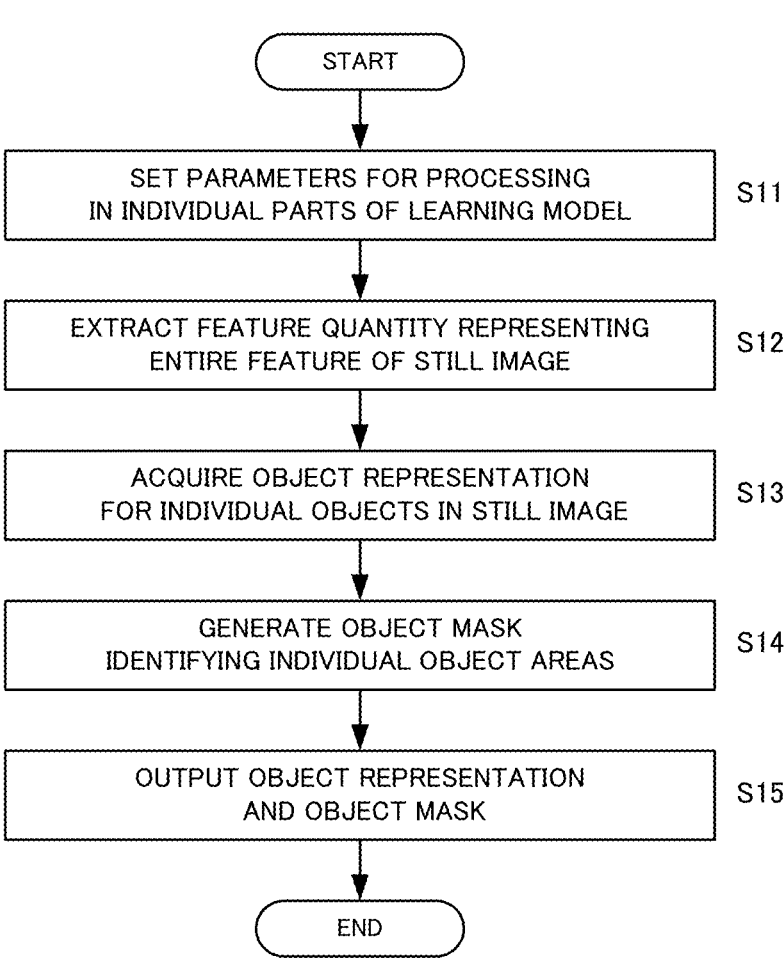
FIG. 5 is a flowchart illustrating an example of processing performed by the learning device according to the first example embodiment.

Subsequently, a flow of processing performed in the learning device according to the first example embodiment will be described. FIG. 5 is a flowchart illustrating an example of processing performed in the learning device according to the first example embodiment.

The learning device 100 sets the parameters for the processing in the individual parts (the feature extraction unit 11, the representation acquisition unit 12, and the mask generation unit 13) of the learning model 10 so that the characteristic (merit) of the learning model 20 corresponding to the knowledge distilled by the information processing device 200 is inherited (step S11). In step S11, a process corresponding to the above-described knowledge distillation may be performed.

After performing the parameter setting in step S11, the learning device 100 extracts the feature quantity representing the feature of the entire still image inputted from outside (step S12). The processes after step S12 correspond to the processes for acquiring the object representations and the object masks corresponding to the individual objects included in the still image, that is inputted to the learning device 100 after the above-described knowledge distillation is performed.

The learning device 100 calculates the representation vectors corresponding to the individual objects included in the still image processed in step S12 on the basis of the feature quantity extracted in step S12. Also, the learning device 100 acquires the calculation result of the representation vectors as the object representations for the individual objects in the still image subjected to the process of step S12 (step S13).

Based on the object representations acquired by step S13, the learning device 100 performs estimation of the object area where the object exists in the still image processed by step S12. In addition, the learning device 100 generates the object masks capable of identifying the individual object areas obtained by the above-described estimation (step S14).

The learning device 100 outputs the object representations acquired by step S13 and the object masks generated by step S14 to the outside (step S15).

As described above, according to this example embodiment, the learning model 10 which inherited the characteristics (merits) of the learning model 20 by the processing of the knowledge distillation can be used to acquire the object representations for the individual objects included in the still image. Therefore, according to the present example embodiment, it is possible to prevent deterioration of recognition accuracy that occurs when object recognition is performed based on the object representations.

The learning device 100 according to the present example embodiment may adjust the parameters for at least one of the processes of the feature extraction unit 11, the representation acquisition unit 12, and the mask generation unit 13 by knowledge distillation using the information processing device 200. Further, in such a case, it is desirable that the parameters are adjusted so that all the losses to be calculated become 0.

Further, according to the present example embodiment, for example, the parameter adjustment for each unit of the learning model 10 may be performed by distilling the knowledge obtained from a series of processes including the process performed in each unit of the learning model 20 and the one or more processes performed based on the object masks DGM and the motion data DGU obtained by the learning model 20. The processes performed based on the object masks DGM and the motion data DGU may include, for example, a process of extracting features of the individual objects included in the moving image DG.

Further, the present example embodiment can also be applied to an information processing system including the learning device 100 and the information processing device 200, for example.

Modification

Hereinafter, a modification to the above example embodiment will be described. For the sake of simplicity, a specific description of the parts to which the above-described process can be applied shall be omitted.

Figure 6:
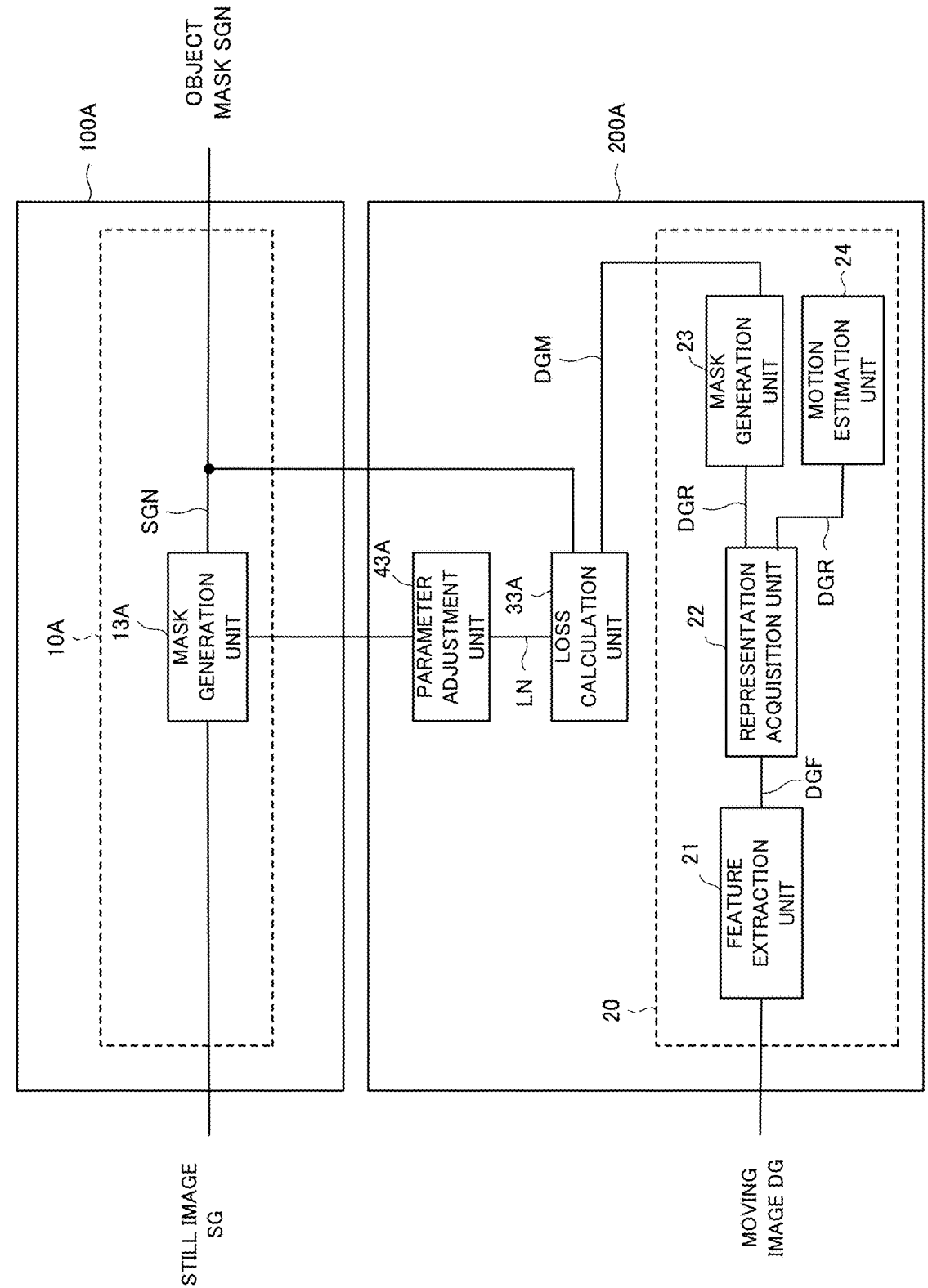
FIG. 6 is a block diagram for explaining a modification of the first example embodiment.

The present example embodiment is not limited to those applied to the learning device 100 and the information processing device 200 having the configuration shown in FIG. 4, but can also be applied to a learning device 100A and an information processing device 200A having the configuration shown in FIG. 6, for example. FIG. 6 is a block diagram for explaining a modification of the first example embodiment.

The learning device 100A has the same hardware configuration as the learning device 100. Also, the learning device 100A includes a learning model 10A.

The learning model 10A is configured as a machine learning model for still images, which is trained to generate the object masks identifying the object areas for the individual objects included in unsupervised still images. Also, the learned model 10A has a configuration corresponding to the instance segmentation model. The learning model 10A has a mask generation unit 13A as shown in FIG. 6.

The mask generation unit 13A generates an object mask SGN identifying the object area SGA that is an area in which an object exists in the still image SG inputted from outside of the learning device 100A for each of the individual objects, and outputs the generated object mask SGN to the outside of the learning device 100A. The object mask SGN is generated, for example, as a mask image in which the individual object areas SGA are filled with different colors. The object mask SGN includes the same number of mask images as the number of objects in the still image SG. Specifically, the mask generation unit 13A can generate the mask images similar to those illustrated in FIG. 3 by performing the same process as the mask generation unit 13.

The information processing device 200A has the same hardware configuration as the learning device 100. Also, the information processing device 200A is configured to be attachable to and detachable from the learning device 100A. As shown in FIG. 6, the information processing device 200A includes a learning model 20, a loss calculation unit 33A, and a parameter adjustment unit 43A.

Figure 7:
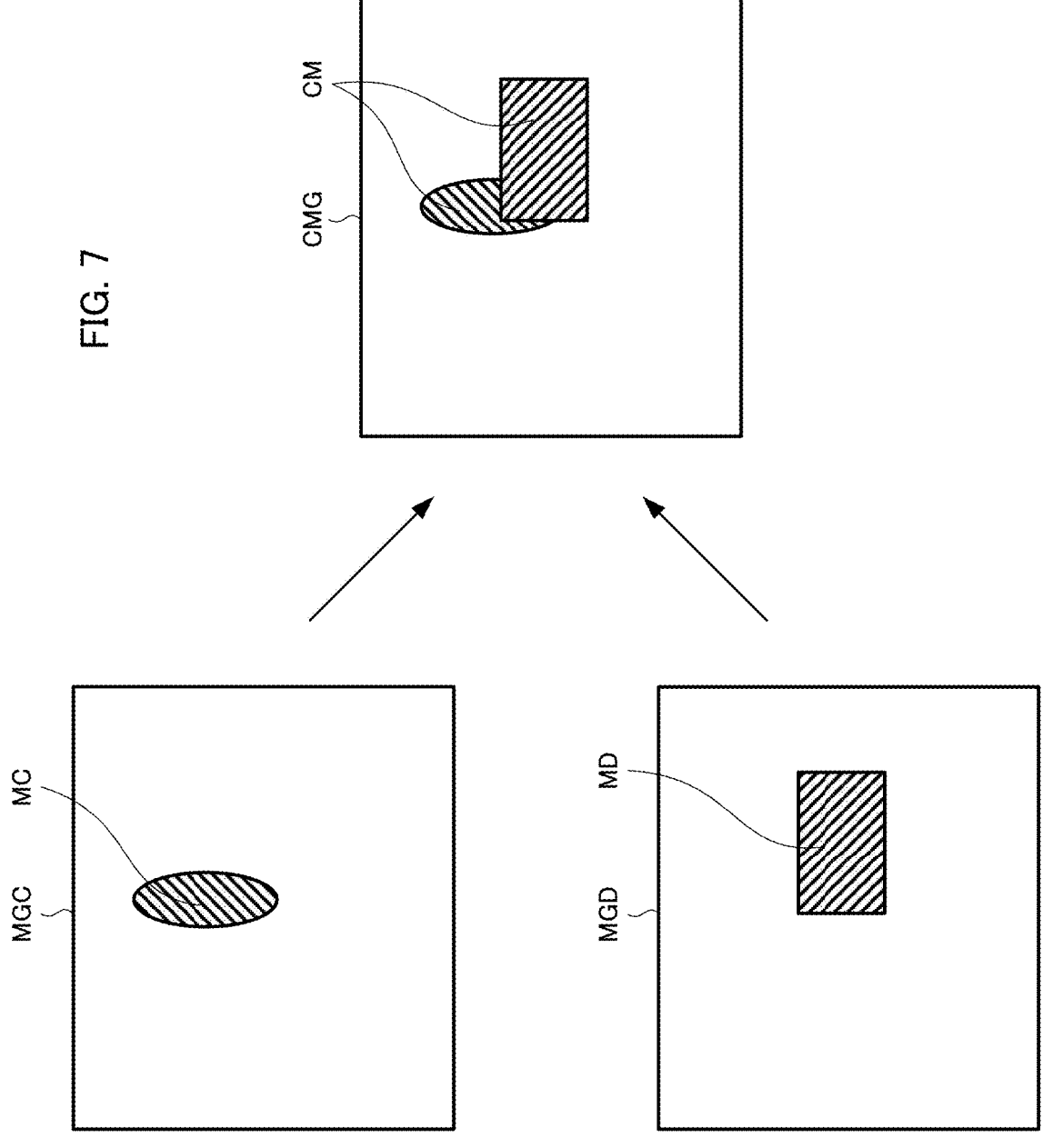
FIG. 7 shows an example of processing related to generation of a synthesized mask image.

The object mask SGN generated by the mask generation unit 13A and the object mask DGM generated by the mask generation unit 23 are inputted to the loss calculation unit 33A. The loss calculation unit 33A calculates a loss LN indicating the difference of the object mask SGN with respect to the object mask DGM, and outputs the calculated loss LN to the parameter adjustment unit 43A. Specifically, the loss calculation unit 33A calculates the difference between the synthesized mask image obtained by synthesizing the highly reliable masks in the mask images included in the object mask DGM and the synthesized mask image obtained by synthesizing the highly reliable masks in the mask images included in the object mask SGN as the loss LN. The aforementioned reliability can be expressed, for example, as a value which is relatively large in one mask indicating the frontmost object area and relatively small in another mask including the object area hidden in the frontmost object area. Further, the above-described difference may be read as an error or a deviation amount. The loss calculation unit 33A may calculate the loss LN based on the synthesized mask image obtained by directly synthesizing the mask image MGA and MGB, when there is no overlapping area (pixel) between the mask MA of the mask image MGA and the mask MB of the mask image MGB as illustrated in FIG. 3. For example, when there is an overlapping area (pixel) between the mask MC of the mask image MGC and the mask MD of the mask image MGD as shown in FIG. 7, the loss calculation unit 33A may calculate the loss LN based on the synthesized mask CMG having the synthesized mask MCM synthesized to indicate the frontmost object area of the mask image MGS and MGD. The synthesized mask CM of FIG. 7 shows the synthesizing result when the reliability of the mask MC is relatively low and the reliability of the mask MD is relatively high in the area where the mask MC and the mask MD overlap. FIG. 7 is a diagram illustrating an example of a process for generating a synthesized mask image.

The parameter adjustment unit 43A adjusts at least one parameter used in the process of generating the object mask SGN by the mask generation unit 13A, based on the loss LN calculated by the loss calculation unit 33A.

According to the information processing device 200A having the above-described configuration, since the process of the knowledge distillation is performed in the loss calculation unit 33A and the parameter adjustment unit 43A, the characteristic (merit) of the learning model 20 can be inherited by the learning model 10A. In other words, the learning device 100A can set parameters for the process of the mask generation unit 13A in the learning model 10A so that the property (merit) of the learning model 20 corresponding to the knowledge distilled by the information processing device 200A is inherited.

When the knowledge distillation is performed using the information processing device 200A having the above-described configuration, it is desirable to repeat the parameter adjustment by the parameter adjustment unit 43A until the loss LN becomes 0. In other words, it is desirable that at least one parameter used in the process of generating the object mask SGN is adjusted such that the loss LN becomes 0. According to the above-described parameter adjustment, the robustness to texture, which is the characteristic (merit) of the learning model 20, may be inherited by the learning model 10A.

As described above, according to this modification, it is possible to acquire the object masks that can identify the object areas of the individual objects included in the still image by using the learning model 10A which inherited the characteristic (merit) of the learning model 20 by the process of the knowledge distillation. Therefore, according to this modification, it is possible to prevent deterioration of the recognition accuracy that occurs when the object recognition is performed based on the object mask.

The knowledge distillation using the information processing device 200A may be applied not only in the case where the learning model 10A has a configuration corresponding to the instance segmentation model, but also in the case where the learning model 10A has a configuration corresponding to either the panoptic segmentation model or the amodal segmentation model.

When the learning model 10A has a configuration corresponding to the panoptic segmentation model, the object mask SGN and the background mask SGH indicating the area other than the object area in the still image SG may be outputted from the mask generation unit 13A. When the learning model 10A has a configuration corresponding to the panoptic segmentation model, the object mask DGM and the background mask DGH indicating the area other than the object area in the moving image DG may be outputted from the mask generation unit 23. When the learning model 10A has a configuration corresponding to the panoptic segmentation model, the loss LN indicating the difference of the object mask SGN with respect to the object mask DGM and the loss LH indicating the difference of the background mask SGH with respect to the background mask DGH may be calculated by the loss calculation unit 33A. The above-described difference may be read as an error or a deviation amount. Further, when the learning model 10A has a configuration corresponding to the panoptic segmentation model, the parameter adjustment based on the loss LN and the loss LH may be performed by the parameter adjustment unit 43A. In such cases, it is desirable that the parameter adjustment by the parameter adjustment unit 43A is repeated until both the loss LN and the loss LH become 0. In other words, when the learning model 10A has a configuration corresponding to the panoptic segmentation model, it is desirable that at least one parameter used in the process of generating the object mask SGN and the background mask SGH is adjusted such that both the loss LN and the loss LH become 0.

When the learning model 10A has a configuration corresponding to the amodal segmentation model, the loss LZ indicating the difference of the object mask SGN with respect to the object mask DGM may be calculated by the loss calculation unit 33A. The loss LZ may be calculated by the same method as the method of calculating the loss LM by the loss calculation unit 33. The above-described difference may be read as an error or a deviation amount. Further, when the learning model 10A has a configuration corresponding to the amodal segmentation model, the parameter adjustment based on the loss LZ may be performed by the parameter adjustment unit 43A. In such cases, it is desirable that the parameter adjustment by the parameter adjustment unit 43A is repeated until the loss LZ becomes 0. In other words, when the learned model 10A has a configuration corresponding to the amodal segmentation model, it is desirable that at least one parameter used in the process of generating the object mask SGN is adjusted so that the loss LZ becomes 0.

Second Example Embodiment

Figure 8:
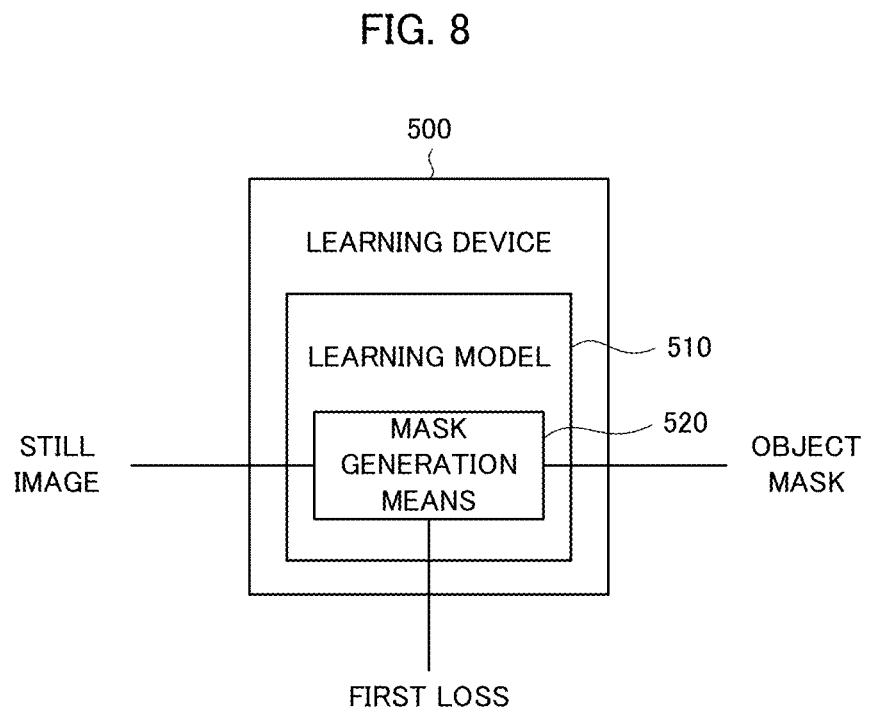

FIG. 8 is a block diagram illustrating a functional configuration of the learning device according to a second example embodiment.

The learning device 500 according to this example embodiment has the same hardware configuration as the learning device 100. In addition, the learning device 500 includes a learning model 510 for a still image. The learning model 510 includes a mask generation means 520.

The mask generation means 520 generates a first object mask identifying an area in which an object exists in a still image, for each individual object.

A first parameter including at least one parameter used for processing of generating the first object mask is adjusted based on a first loss, the first loss indicating a difference of the first object mask with respect to a second object mask identifying an area in which an object exists in a moving image including the still image, for each individual object.

According to this example embodiment, it is possible to prevent deterioration of recognition accuracy in object recognition.

A part or all of the example embodiments described above may also be described as the following supplementary notes, but not limited thereto.

(Supplementary Note 1)

A learning device comprising a learning model for a still image, wherein the learning model includes a mask generation means configured to generate a first object mask identifying an area in which an object exists in a still image, for each individual object, and wherein a first parameter including at least one parameter used for processing of generating the first object mask is adjusted based on a first loss, the first loss indicating a difference of the first object mask with respect to a second object mask identifying an area in which an object exists in a moving image including the still image, for each individual object.

(Supplementary Note 2)

The learning device according to Supplementary note 1, wherein the first parameter is adjusted such that the first loss becomes 0.

(Supplementary Note 3)

The learning device according to Supplementary note 1, wherein the learning model further comprises a feature extraction means configured to extract a first feature quantity representing a feature of the entire still image, and wherein a second parameter including at least one parameter used for processing of extracting the first feature quantity is adjusted based on a second loss, the second loss indicating a difference of the first feature quantity with respect to a second feature quantity representing a feature of the entire moving image.

(Supplementary Note 4)

The learning device according to Supplementary note 3, wherein the first parameter and the second parameter are adjusted such that both the first loss and the second loss become 0.

(Supplementary Note 5)

The learning device according to Supplementary note 1, wherein the learning model further comprises a representation acquisition means configured to acquire a first object representation for each individual object in the still image, and wherein a third parameter including at least one parameter used for processing of acquiring the first object representation is adjusted based on a third loss, the third loss indicating a difference of the first object representation with respect to a second object representation, for each individual object in the moving image.

(Supplementary Note 6)

The learning device according to Supplementary note 5, wherein the first parameter and the third parameter are adjusted such that both the first loss and the third loss become 0.

(Supplementary Note 7)

The learning device according to Supplementary note 1, wherein the learning model comprises:

a feature extraction means configured to extract a first feature quantity representing a feature of the entire still image;

a representation acquisition means configured to acquire a first object representation for each individual object in the still image based on the first feature quantity; and the mask generation means configured to generate the first object mask based on the first object representation,

wherein a second parameter including at least one parameter used in the process of extracting the first feature quantity is adjusted based on a second loss, the second loss indicating a difference of the first feature quantity with respect to a second feature quantity representing a feature of the entire moving image, and wherein a third parameter including at least one parameter used for processing of acquiring the first object representation is adjusted based on a third loss, the third loss indicating a difference of the first object representation with respect to a second object representation, for each individual object in the moving image.

(Supplementary Note 8)

The learning device according to Supplementary note 7, wherein the first parameter, the second parameter and the third parameter are adjusted so that all the first loss, the second loss and the third loss become 0.

(Supplementary Note 9)

A parameter adjustment method applied to a learning model for a still image that generates a first object mask identifying an area where an object exists in a still image for each individual object, the method comprising:

adjusting a first parameter including at least one parameter used for processing of generating the first object mask based on a first loss, the first loss indicating a difference of the first object mask with respect to a second object mask identifying an area where an object exists in a moving image including the still image, for each individual object.

(Supplementary Note 10)

A recording medium storing a program, the program causing a computer to execute processing for a learning model for a still image that generates a first object mask identifying an area where an object exists in a still image for each individual object, the processing comprising:

adjusting a first parameter including at least one parameter used for processing of generating the first object mask based on a first loss, the first loss indicating a difference of the first object mask with respect to a second object mask identifying an area where an object exists in a moving image including the still image, for each individual object.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

This application is based upon and claims the benefit of priority from Japanese Patent Application 2022-179283, filed on Nov. 9, 2022, the disclosure of which is incorporated herein in its entirety by reference.

DESCRIPTION OF SYMBOLS

10 Learning model
11 Feature extraction unit
12 Representation acquisition part
13 Mask generation unit
100 Learning device

The invention claimed is:

1. A learning device comprising:

a memory configured to store instructions; and a processor functioning as a learning model for a still image, the processor configured to execute the instructions to:

generate a first object mask identifying an area in which an object exists in the still image, for each individual object, wherein a first parameter including at least one parameter used for processing of generating the first object mask is adjusted based on a first loss, the first loss indicating a difference of the first object mask with respect to a second object mask identifying an area in which an object exists in a moving image including the still image, for each individual object, wherein the processor is further configured to execute the instructions to extract a first feature quantity representing a feature of the entire still image, wherein a second parameter including at least one parameter used for processing of extracting the first feature quantity is adjusted based on a second loss, the second loss indicating a difference of the first feature quantity with respect to a second feature quantity representing a feature of the entire moving image.

2. The learning device according to claim 1, wherein the first parameter is adjusted in a manner that the first loss becomes 0.

3. The learning device according to claim 1, wherein the first parameter and the second parameter are adjusted in a manner that both the first loss and the second loss become 0.

4. The learning device according to claim 1, wherein the processor is further configured to execute the instructions to acquire a first object representation for each individual object in the still image, wherein a third parameter including at least one parameter used for processing of acquiring the first object representation is adjusted based on a third loss, the third loss indicating a difference of the first object representation with respect to a second object representation, for each individual object in the moving image.

5. The learning device according to claim 4, wherein the first parameter and the third parameter are adjusted in a manner that both the first loss and the third loss become 0.

6. The learning device according to claim 1, wherein the processor is configured to execute the instructions to:

extract the first feature quantity;

acquire a first object representation for each individual object in the still image based on the first feature quantity; and generate the first object mask based on the first object representation, wherein a third parameter including at least one parameter used for processing of acquiring the first object representation is adjusted based on a third loss, the third loss indicating a difference of the first object representation with respect to a second object representation, for each individual object in the moving image.

7. The learning device according to claim 6, wherein the first parameter, the second parameter and the third parameter are adjusted in a manner that all the first loss, the second loss and the third loss become 0.

8. A parameter adjustment method applied to a learning model for a still image that generates a first object mask identifying an area where an object exists in the still image for each individual object, the method comprising:

adjusting a first parameter including at least one parameter used for processing of generating the first object mask based on a first loss, the first loss indicating a difference of the first object mask with respect to a second object mask identifying an area where an object exists in a moving image including the still image, for each individual object, wherein further executing the instructions to extract a first feature quantity representing a feature of the entire still image, wherein a second parameter including at least one parameter used for processing of extracting the first feature quantity is adjusted based on a second loss, the second loss indicating a difference of the first feature quantity with respect to a second feature quantity representing a feature of the entire moving image.

9. A non-transitory computer-readable recording medium storing a program, the program causing a computer to execute processing for a learning model for a still image that generates a first object mask identifying an area where an object exists in the still image for each individual object, the processing comprising:

adjusting a first parameter including at least one parameter used for processing of generating the first object mask based on a first loss, the first loss indicating a difference of the first object mask with respect to a second object mask identifying an area where an object exists in a moving image including the still image, for each individual object, wherein further executing the instructions to extract a first feature quantity representing a feature of the entire still image, wherein a second parameter including at least one parameter used for processing of extracting the first feature quantity is adjusted based on a second loss, the second loss indicating a difference of the first feature quantity with respect to a second feature quantity representing a feature of the entire moving image.

* * * * *